(12) United States Patent
Okaya et al.

(10) Patent No.: US 9,614,625 B2
(45) Date of Patent: Apr. 4, 2017

(54) VISIBLE LIGHT COMMUNICATION SYSTEM

(71) Applicants: KAWASAKI JUKOGYO KABUSHIKI KAISHA, Kobe-shi, Hyogo (JP); DAITRON TECHNOLOGY CO., LTD., Osaka-shi, Osaka (JP)

(72) Inventors: Noriyuki Okaya, Kobe (JP); Minehiko Mukaida, Kobe (JP); Takashi Koyabu, Osaka (JP); Masaki Hori, Osaka (JP)

(73) Assignees: Kawasaki Jukogyo Kabushiki Kaisha, Hyogo (JP); Daitron Technology Co., Ltd., Osaka (JP)

( * ) Notice: Subject to any disclaimer, the term of this patent is extended or adjusted under 35 U.S.C. 154(b) by 0 days.

(21) Appl. No.: 14/438,068

(22) PCT Filed: Oct. 23, 2013

(86) PCT No.: PCT/JP2013/006267
§ 371 (c)(1),
(2) Date: Apr. 23, 2015

(87) PCT Pub. No.: WO2014/064934
PCT Pub. Date: May 1, 2014

(65) Prior Publication Data
US 2015/0280839 A1    Oct. 1, 2015

(30) Foreign Application Priority Data

Oct. 26, 2012    (JP) .................................. 2012-236810

(51) Int. Cl.
*H04B 10/116*    (2013.01)
*H04B 13/02*    (2006.01)

(52) U.S. Cl.
CPC ........... *H04B 13/02* (2013.01); *H04B 10/116* (2013.01)

(58) Field of Classification Search
CPC ..................................................... H04B 10/116
See application file for complete search history.

(56) References Cited

U.S. PATENT DOCUMENTS

| | | | | |
|---|---|---|---|---|
| 4,664,518 A | * | 5/1987 | Pfund | H04B 7/185 356/139.04 |
| 8,233,801 B2 | * | 7/2012 | Sexton | H04B 11/00 181/110 |

(Continued)

FOREIGN PATENT DOCUMENTS

| | | |
|---|---|---|
| JP | 2008-304649 | 12/2008 |
| JP | 2009-055408 A | 3/2009 |
| JP | 2009-278455 | 11/2009 |

OTHER PUBLICATIONS

D. Wu, et al., Optimisation of Lambertian order for indoor non-directed optical wireless communication, 2012 1st IEEE International Conference on Communications in China Workshops (ICCC), Aug. 15, 2012, pp. 43-48.

(Continued)

*Primary Examiner* — Nathan Curs
(74) *Attorney, Agent, or Firm* — Norris McLaughlin & Marcus, P.A.

(57) ABSTRACT

In a visible light communication system including a transmission device and a receiving device arranged separately in a vertical direction and provided so as to relatively move in a horizontal direction, which transmits data from the transmission device to the receiving device by optical space transmission using visible light, the transmission device includes a first light emitting part outputting visible light, and the first light emitting part has a light source emitting visible light and a correction part correcting the light radi- (Continued)

ated from the light source so as to uniform a light intensity distribution on a horizontal plane. Even when the transmission device and the receiving device arranged separately in the vertical direction relatively move in a horizontal direction, data can be stably transmitted and received by the optical space transmission using visible light.

4 Claims, 2 Drawing Sheets

(56) References Cited

U.S. PATENT DOCUMENTS

| | | | |
|---|---|---|---|
| 2007/0183782 A1* | 8/2007 | Farr | H04B 13/02 398/104 |
| 2007/0292141 A1* | 12/2007 | Kim | H04B 10/1149 398/182 |
| 2008/0107420 A1* | 5/2008 | Nakaso | H04B 10/116 398/130 |

OTHER PUBLICATIONS

D. Wu, et al., Channel characteristics analysis of diffuse indoor cellular optical wireless communication systems, ACP, Asia Communications and Photonics Conference and Exhibition, 2011, Nov. 13, 2011, pp. 1-6.

Z. Ghassemlooy, Indoor Optical Wireless Communication Systems—Part I: Review, Indoor optical wireless communication systems, part I: Review [online], pp. 11-31, <retrieval date Nov. 7, 2013>, Internet <URL: htttp://soe.northumbria.ac.uk/ocr/downloads/parti-rev.pdf.>.

* cited by examiner

VISIBLE LIGHT COMMUNICATION SYSTEM

TECHNICAL FIELD

The present invention relates to a visible light communication system, and particularly relates to a visible light communication system which can be applied to communication in water.

BACKGROUND ART

The transmission/reception of data in water is performed by mainly using acoustics, and it is proposed that visible light is used for realizing communication of larger capacity data more quickly (for example, refer to PTL 1).

In PTL 1, there is disclosed a visible light communication system in which observation data is transmitted and received to an underwater mobile body which moves underwater from an observation instrument installed in water by optical space transmission using visible light. In PTL 2, a visible light communication cat ion system transmitting and receiving audio data between divers existing underwater by optical space transmission using visible light is disclosed.

CITATION LIST

Patent Literature

PTL 1: JP-A-2009-278455
PTL 2: JP-A-2008-304649

SUMMARY OF INVENTION

Technical Problem

However, there exist the following problems because the transmission side and the receiving side are separately arranged in a vertical direction and the communication is performed while relatively moving in a horizontal direction in many cases in the communication performed in water between the underwater mobile body and the observation instrument, between divers and between a ship on the sea and a diver.

That is, a light source emitting visible light on the transmission side normally has directional characteristics of a so-called Lambertian light distribution in which the illuminance is the highest at the center and the illuminance angle θ is increased (on an optical axis), whereas the illuminance is reduced rapidly toward the periphery, therefore, when the transmission side and the receiving side relatively move in the horizontal direction, the light amount received in the receiving side is rapidly reduced and it becomes difficult to perform the stable communication.

The present invention has been made in view of the above problems and an object thereof is to provide a visible light communication system capable of transmitting and receiving data stably by the optical space transmission using visible light even when a transmission device and a receiving device separately arranged in the vertical direction relatively move in the horizontal direction.

Solution to Problem

A visible light communication system according to a first embodiment of the present invention includes a transmission device and a receiving device arranged separately in a vertical direction and provided so as to relatively move in a horizontal direction, in which data is transmitted from the transmission device to the receiving device by optical space transmission using visible light, the transmission device has a first light emitting part outputting visible light, and the first light emitting part has a light source emitting visible light and a correction part correcting the light emitted from the light source so as to uniform a light intensity distribution on a horizontal plane.

A visible light communication system according to a second embodiment of the present invention includes a transmission device and a receiving device arranged separately in a vertical direction and provided so as to relatively move in a horizontal direction, in which data is transmitted from the transmission device to the receiving device by optical space transmission using visible light, the transmission device includes a first light emitting pare outputting visible light, the first light emitting part has plural light sources emitting visible light, and at least part of light emitted from the each light sources is overlapped so as to uniform a light intensity distribution on a horizontal plane.

Advantageous Effects of Invention

According to the present invention, it is possible to transmit and receive data stably by optical space transmission using visible light even when the transmission device and the receiving device arranged separately in a vertical direction relatively move in a horizontal direction.

DESCRIPTION OF EMBODIMENTS

Hereinafter, an embodiment of the present invention will be explained with reference to the drawings.

Figure 1:
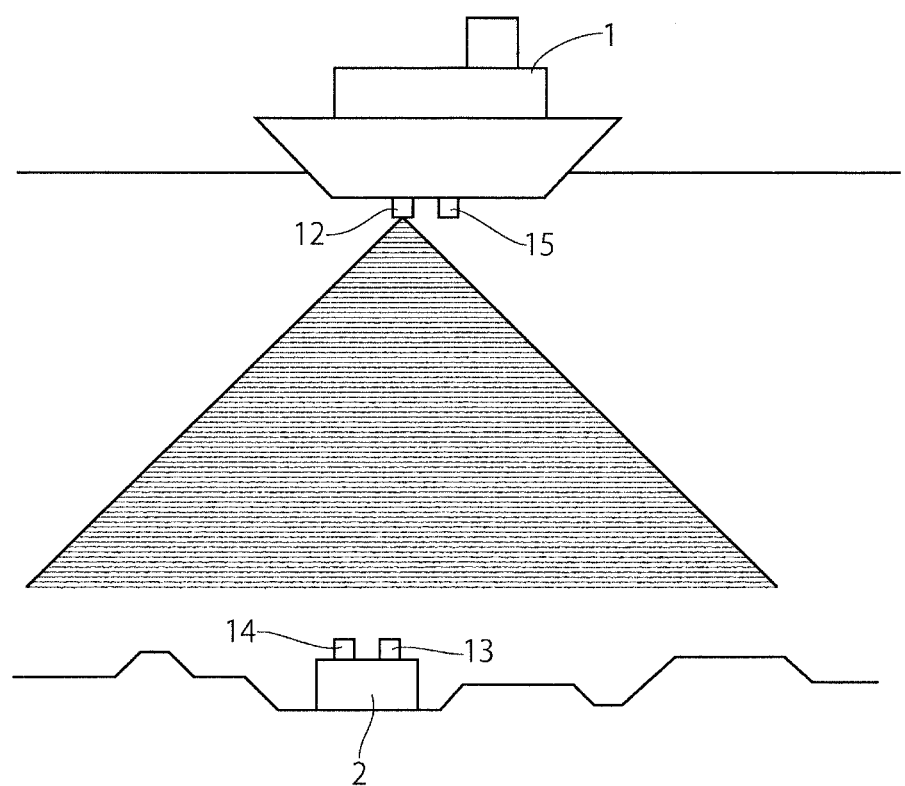
FIG. 1 is a view showing a visible light communication system according to an embodiment of the present invention.

A visible light communication system 10 according to the embodiment includes a transmission device 12 and a receiving device 14, which transmits data from the transmission device 12 to the receiving device 14 by optical space transmission using visible light. In the visible light communication system 10, the transmission device 12 is installed in a ship 1 mooring or moving on the water surface, the receiving device 14 is installed in a mobile body 2 such as a diver moving underwater, and the transmission device 12 and the receiving device 14 are separately arranged in a vertical direction while being capable of relatively moving in a horizontal direction as shown in, for example, FIG. 1.

The ship 1 is provided with a receiving device 15 in addition to the transmission device 12 and the mobile body 2 is provided with a transmission device 13 in addition to the receiving device 14. The receiving device 15 of the ship 1 and the transmission device 13 of the mobile body 2 differ from the transmission device 12 of the ship 1 and the receiving device 14 of the mobile body 2 in a point that directions of optical axes of light sources are reversed vertically, however, they are the same in other structures, therefore, the transmission device 12 and the receiving device 14 will be explained and the explanation of the transmission device 13 and the receiving device 15 is omitted here.

Figure 2:
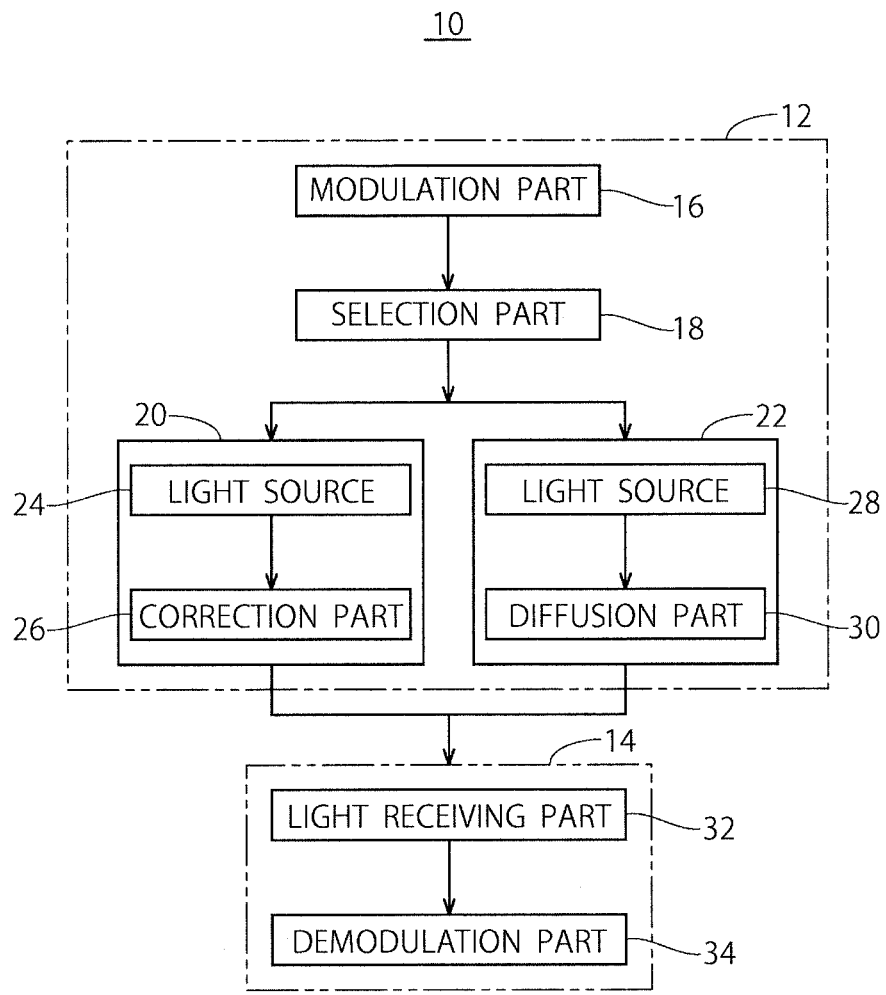
FIG. 2 is a block diagram of the visible light communication system shown in FIG. 1.

As shown in FIG. 2, the transmission device 12 includes a modulation part 16, a selection part 18, a first light emitting part 20 and a second light emitting part 22.

The modulation part 16 modulates data to be transmitted to the receiving device 14 into an optical control signal and outputs the signal to the selection part 18. The selection part 18 selects one light emitting part used for optical space transmission to the receiving device 14 from the first light emitting part 20 and the second light emitting part 22, which selects the light emitting part designated by the user and outputs the optical control signal inputted from the modulation part 16 to the selected one light emitting part in this example.

The first light emitting part 20 includes a light source 24 such as an LED and a correction part 26 arranged on an optical axis of the light source 24. The light source 24 is arranged so that the optical axis is directed upward, emits visible light corresponding to the optical control signal inputted from the selection part 18 and radiates the light to the correction part 26.

The correction part 26 corrects the light from the light source 24 so as to uniform an intensity distribution of light radiated from the light source 24, then, outputs the light to the outside. For example, a convex lens or the like which converts the light from the light source 24 into a parallel light is used as the correction part 26.

The second light emitting part 20 has a light source 28 such as an LED and a diffusion part 30. The light source 28 is arranged so that the optical axis is directed upward, emits visible light corresponding to the optical control signal inputted from the selection part 18 and radiates the light to the diffusion part 30.

The diffusion part 30 diffuses the light radiated from the light source 28 and outputs the light to the outside. The LED used as the light source 28 has directional characteristics of a so-called Lambertian light distribution in which the illuminance is the highest at the center and the illuminance angle θ is increased, whereas the illuminance is reduced rapidly toward the periphery, therefore, visible light outputted from the diffusion part 30 has also the Lambertian light distribution.

The light receiving device 14 includes a light receiving part 32 and a demodulation part 34. The light receiving part 32 has a photodiode, receives visible light transmitted from the transmission device 12 and converts the light into an electric signal to be outputted to the demodulation part 34. The demodulation part 34 demodulates the electric signal outputted from the light receiving part 32 and acquires data included in visible light.

As described above, in the visible light communication system 10 according to the embodiment, the visible light in which a light intensity distribution is uniformed on a horizontal plane is outputted from the transmission device 12, and visible light having intensities approximately equal over a wide range in the horizontal direction can be radiated, therefore, data can be transmitted and received stable by optical space transmission even when the transmission device 12 and the receiving device 14 relatively move in the horizontal direction.

Also in the embodiment, as the selection part 18 selects the light emitting part to be used for optical space transmission from the first light emitting part 20 outputting visible light in which the light intensity distribution is uniformed on the horizontal plane and the second light emitting part outputting visible light in which the light intensity distribution is the Lambertian light distribution on the horizontal plane, it is possible to select a suitable intensity distribution of visible light outputted from the appropriate transmission device 12 in accordance with movement conditions of the transmission device 12 and the receiving device 14, therefore, data can be transmitted and received further stably.

In the above embodiment, the correction part 26 provided in the first light emitting part 20 corrects the light from the light source 24 to thereby uniform the light intensity distribution of visible light to be outputted from the transmission device 12 on the horizontal plane, however, it is also preferable that, for example, plural light sources 24 are provided in the first light emitting part 20 and at least part of light radiated from the plural light sources 24 is overlapped to thereby uniform the intensity distribution of visible light to be outputted from the transmission device 12 on the horizontal plane.

REFERENCE SIGNS LIST

1: ship
2: mobile body
10: visible light communication system
12: transmission device
14: receiving device
16: modulation part
18: selection part
20: first light emitting part
22: second light emitting part
24: light source
26: correction part
28: light source
30: diffusion plate
32: light receiving part
34: demodulation part

The invention claimed is:

1. A visible light communication system comprising a transmission device and a receiving device arranged separately in a direction which is vertical relative to the Earth and configured so as to relatively move in a horizontal direction, the horizontal direction being relative to the Earth, in which data is transmitted from the transmission device to the receiving device by optical space transmission using visible light, the transmission device including a first light emitting part adapted to output visible light, a second light emitting part adapted to output visible light, and a selection part configured to select one of the first and second light emitting parts to output visible light for the optical space transmission while the other of the first and second light emitting parts does not output visible light, wherein:

the first light emitting part has a light source adapted to emit visible light and a correction part adapted to correct the light radiated from the light source so as to effect a uniform light intensity distribution on a plane which is horizontal relative to the Earth; and the second light emitting part has a light source adapted to emit visible light having a light intensity distribution on said horizontal plane which is a Lambertian light distribution.

2. The visible light communication system according to claim 1, wherein at least one of the transmission device and the receiving device is arranged underwater, and the visible light outputted from the transmission device is transmitted to the receiving device through the water.

3. A visible light communication system comprising a transmission device and a receiving device arranged separately in a direction which is vertical relative to the Earth and configured so as to relatively move in a horizontal direction, the horizontal direction being relative to the Earth, in which data is transmitted from the transmission device to the receiving device by optical space transmission using visible light, the transmission device including a first light emitting part adapted to output visible light, a second light emitting part adapted to output visible light, and a selection part configured to select only one of the first and second light emitting parts to output visible light for the optical space transmission while the other of the first and second light emitting parts does not output visible light, wherein:

the first light emitting part has plural light sources adapted to emit visible light, and the plural light sources are configured so that at least part of visible light from the plural light sources overlaps so as to effect a uniform visible light intensity distribution on a plane which is horizontal relative to the Earth; and the second light emitting part has a light source adapted to emit visible light having a light intensity distribution on said horizontal plane which is a Lambertian light distribution.

4. The visible light communication system according to claim 3, wherein at least one of the transmission device and the receiving device is arranged underwater, and the visible light outputted from the transmission device is transmitted to the receiving device through the water.

\* \* \* \* \*